United States Patent
Yang

(10) Patent No.: US 8,944,951 B2
(45) Date of Patent: Feb. 3, 2015

(54) DUAL-DRIVE ELECTRIC MACHINE HAVING CONTROLLABLE PLANETARY GEAR SET (1)

(76) Inventor: Tai-Her Yang, Dzan-Hwa (TW)

( * ) Notice: Subject to any disclaimer, the term of this patent is extended or adjusted under 35 U.S.C. 154(b) by 92 days.

(21) Appl. No.: 13/033,772

(22) Filed: Feb. 24, 2011

(65) Prior Publication Data

US 2012/0220409 A1 Aug. 30, 2012

(51) Int. Cl.
F16H 48/06 (2006.01)
F16H 3/72 (2006.01)

(52) U.S. Cl.
CPC ........ F16H 3/724 (2013.01); F16H 2200/2005 (2013.01)
USPC .......................................................... 475/154

(58) Field of Classification Search
CPC ........................................................ F16H 48/06
USPC ................................................. 475/149, 156
See application file for complete search history.

(56) References Cited

U.S. PATENT DOCUMENTS

| | | | | |
|---|---|---|---|---|
| 6,251,037 B1* | 6/2001 | Baumgaertner et al. | ........... | 475/2 |
| 6,297,575 B1* | 10/2001 | Yang | .............................. | 310/266 |
| 7,549,939 B2* | 6/2009 | Strauss et al. | ..................... | 475/5 |
| 7,618,340 B2* | 11/2009 | Yang | .............................. | 475/150 |
| 2003/0054910 A1* | 3/2003 | Nett | ................... | 475/5 |
| 2004/0077448 A1* | 4/2004 | Oshidari et al. | ................... | 475/5 |
| 2007/0129198 A1* | 6/2007 | Atarashi | ........................ | 475/5 |
| 2012/0100957 A1* | 4/2012 | Reitz | ................................ | 477/8 |

* cited by examiner

*Primary Examiner* — Justin Holmes
*Assistant Examiner* — Stacey Fluhart
(74) *Attorney, Agent, or Firm* — Bacon & Thomas, PLLC

(57) ABSTRACT

The present invention relates to a clutch device structured by a dual-drive electric machine being combined with an planetary gear set (DG101) and a controllable brake device, and through controlling the controllable brake device to perform brake locking or releasing, the operations of transmission function of connecting transmission or releasing between a rotation shaft (S101) at an output/input end, a rotation shaft (S102) at an output/input end and a sleeve type rotation shaft (AS101) at an output/input end of the planetary gear set (DG101) are enabled to be controlled, thereby to control the interactive operations between the dual-drive electric machine (EM100) and the output/input ends.

19 Claims, 3 Drawing Sheets

DUAL-DRIVE ELECTRIC MACHINE HAVING CONTROLLABLE PLANETARY GEAR SET (1)

BACKGROUND OF THE INVENTION (a) Field of the Invention

The present invention relates to a clutch device structured by a dual-drive electric machine being combined with an planetary gear set (DG101) and a controllable brake device, and through controlling the controllable brake device to perform brake locking or releasing, the operations of transmission function of connecting transmission or releasing between a rotation shaft (S101) at an output/input end, a rotation shaft (S102) at an output/input end and a sleeve type rotation shaft (AS101) at an output/input end of the planetary gear set (DG101) are enabled to be controlled, thereby to control the interactive operations between the dual-drive electric machine (EM100) and the output/input ends.

(b) Description of the Prior Art

Conventionally, a friction type electromagnetic clutch device is often installed between the output/input end of a rotation electric machine and a load; and through electrically charging or breaking the friction type electromagnetic clutch device to perform operations of combining or releasing, the load is enabled to engaged or released with the rotary electric machine. One primary disadvantage of the conventional arts is that residual rotary torque is often remained during the releasing, which may cause the kinetic energy loss and the ineffective operation.

SUMMARY OF THE INVENTION

The present invention provides a dual-drive electric machine having a controllable planetary gear set (1), in which an inner rotation part of the electric machine (EM101) of the dual-drive electric machine (EM100) being combined with a sun wheel (W101) of an planetary gear set (DG101) and combined with a rotation shaft (S101) shared by the above two is served as an output/input end, a rotation shaft (S102) combined with an outer annular wheel (W102) is served as an output/input end, and a rocker arm (A101) linked by an planetary wheel (W103) of the planetary gear set (DG101) combined with an outer rotation part of electric machine (EM102) and combined with a sleeve type rotation shaft (AS101) is served as an output/input end, so that a part or all of the three output/input ends are respectively connected to an action side of a corresponding controllable brake device, and the other action side of the controllable brake device is connected to a housing (H100); through controlling the controllable brake device to perform brake locking or releasing, the operations of transmission function of connecting transmission or releasing between the rotation shaft (S101) at the output/input end, the rotation shaft (S102) at the output/input end and the sleeve type rotation shaft (AS101) at the output/input end of the planetary gear set (DG101) are enabled to be controlled, and the interactive operations between the dual-drive electric machine (EM100) and the output/input ends are also enabled to be controlled.

DESCRIPTION OF MAIN COMPONENT SYMBOLS

A101: Rocker arm
AS101: Sleeve type rotation shaft
BK101, BK102, BK103: Controllable brake device
DG101: Planetary gear set
EM100: Dual-drive electric machine
EM101: Inner rotation part of electric machine
EM102: Outer rotation part of electric machine
H100: Housing
S101-S102: Rotation shaft
W101: Sun wheel
W102: Outer annular wheel
W103: Planetary wheel

DETAILED DESCRIPTION OF THE PREFERRED EMBODIMENTS

Conventionally, a friction type electromagnetic clutch device is often installed between the output/input end of a rotation electric machine and a load; and through electrically charging or breaking the friction type electromagnetic clutch device to perform operations of combining or releasing, the load is enabled to engaged or released with the rotary electric machine. One primary disadvantage of the conventional arts is that residual rotary torque is often remained during the releasing, which may cause the kinetic energy loss and the ineffective operation.

The present invention provides a dual-drive electric machine having a controllable planetary gear set (1), in which an inner rotation part of the electric machine (EM101) of the dual-drive electric machine (EM100) being combined with a sun wheel (W101) of an planetary gear set (DG101) and combined with a rotation shaft (S101) shared by the above two is served as an output/input end, a rotation shaft (S102) combined with an outer annular wheel (W102) is served as an output/input end, and a rocker arm (A101) linked by an planetary wheel (W103) of the planetary gear set (DG101) combined with an outer rotation part of electric machine (EM102) and combined with a sleeve type rotation shaft (AS101) is served as an output/input end, so that a part or all of the three output/input ends are respectively connected to an action side of a corresponding controllable brake device, and the other action side of the controllable brake device is connected to a housing (H100); through controlling the controllable brake device to perform brake locking or releasing, the operations of transmission function of connecting transmission or releasing between the rotation shaft (S101) at the output/input end, the rotation shaft (S102) at the output/input end and the sleeve type rotation shaft (AS101) at the output/input end of the planetary gear set (DG101) are enabled to be controlled, and the interactive operations between the dual-drive electric machine (EM100) and the output/input ends are also enabled to be controlled.

Figure 1:
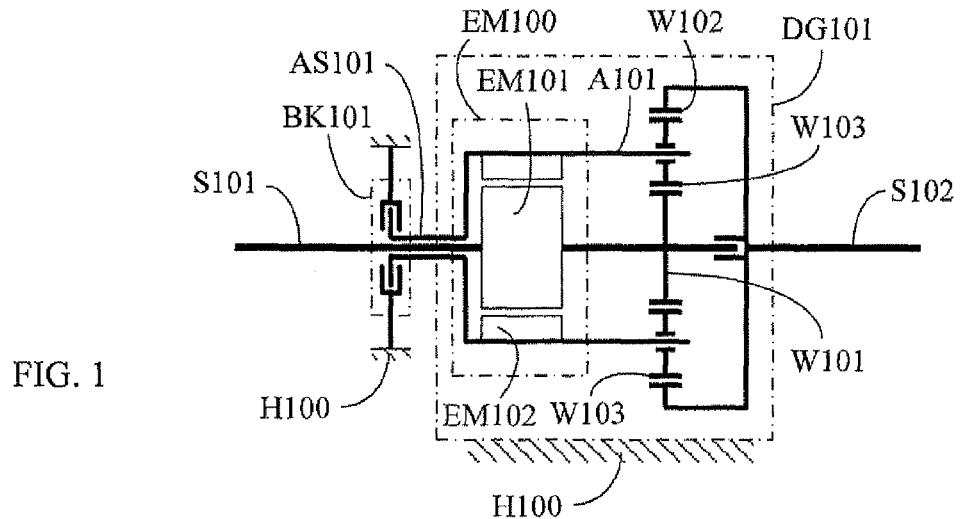
FIG. 1 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end, the rocker arm (A101) linked by the planetary wheel (W103) being combined with the outer rotation part of electric machine (EM102) and combined with the sleeve type rotation shaft (AS101), the sleeve type rotation shaft (AS101) rotated and sleeved on the rotation shaft (S101) being served as an output/input end and provided for connecting to an action side of the controllable brake device (BK101) while the other action side of the controllable brake device (BK101) being fixed in the housing (H100), the planetary gear set (DG101) also being fixed in the housing (H100), and the outer annular wheel (W102) of the planetary gear set (DG101) being provided for driving the rotation shaft (S102) to be served as an output/input end, according to one embodiment of the present invention.

The structures and embodiments of the dual-drive electric machine having controllable planetary gear set (1) of the present invention are disclosed as followings:

FIG. 1 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end, the rocker arm (A101) linked by the planetary wheel (W103) being combined with the outer rotation part of electric machine (EM102) and combined with the sleeve type rotation shaft (AS101), the sleeve type rotation shaft (AS101) rotated and sleeved on the rotation shaft (S101) being served as an output/input end and provided for connecting to an action side of the controllable brake device (BK101) while the other action side of the controllable brake device (BK101) being fixed in the housing (H100), the planetary gear set (DG101) also being fixed in the housing (H100), and the outer annular wheel (W102) of the planetary gear set (DG101) being provided for driving the rotation shaft (S102) to be served as an output/input end, according to one embodiment of the present invention.

As show in FIG. 1, it mainly consists of:

Planetary gear set (DG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

Rocker arm (A101): having one end provided for allowing the planetary wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the sun wheel (W101) of the planetary gear set (DG101) and the inner rotation part of electric machine (EM101) of the dual-drive electric machine (EM100) is served as an output/input end, the rocker arm (A101) linked by the planetary wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end, and the sleeve type rotation shaft (AS101) is connected to an action side of the controllable brake device (BK101) while the other action side of the controllable brake device (BK101) is fixed in the housing (H100), and the outer annular wheel (W102) of the planetary gear set (DG101) is provided for driving the rotation shaft (S102) to be served as an output/input end, and the rotation shaft (S101) connected with the sun wheel (W101) is also served as an output/input end;

According to the embodiment shown in FIG. 1, the operations of the dual-drive electric machine having controllable planetary gear set (1) of the present invention include one or more than one of following functions:

When the controllable brake device (BK101) is controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK101) is controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state, and the dual-drive electric machine (EM100) is not operated as the electric machinery function, the transmission relation between the rotation shaft (S101) and the rotation shaft (S102) is in a connecting relation allowing for transmission;

When the controllable brake device (BK101) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function for performing interactive operations according to the damping of the external load or the externally inputted rotary kinetic energy sustained by the rotation shaft (S101) and the rotation shaft (S102);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 2:
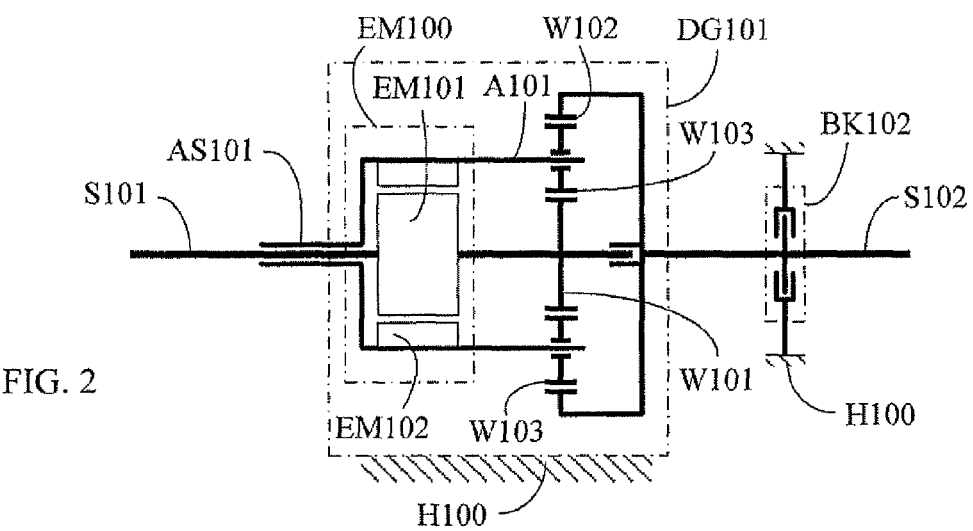
FIG. 2 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end, the rocker arm (A101) linked by the planetary wheel (W103) being combined with the outer rotation part of electric machine (EM102) and combined with the sleeve type rotation shaft (AS101), the sleeve type rotation shaft (AS101) sleeved on the rotation shaft (S101) being served as an output/input end, the outer annular wheel (W102) of the planetary gear set (DG101) being provided for driving the rotation shaft (S102) to be served as an output/input end, and the rotation shaft (S102) being connected to an action side of the controllable brake device (BK102) while the other action side of the controllable brake device (BK102) being fixed in the housing (H100), according to one embodiment of the present invention.

FIG. 2 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end, the rocker arm (A101) linked by the planetary wheel (W103) being combined with the outer rotation part of electric machine (EM102) and combined with the sleeve type rotation shaft (AS101), the sleeve type rotation shaft (AS101) sleeved on the rotation shaft (S101) being served as an output/input end, the outer annular wheel (W102) of the planetary gear set (DG101) being provided for driving the rotation shaft (S102) to be served as an output/input end, and the rotation shaft (S102) being connected to an action side of the controllable brake device (BK102) while the other action side of the controllable brake device (BK102) being fixed in the housing (H100), according to one embodiment of the present invention.

As show in FIG. 2, it mainly consists of

Planetary gear set (DG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

Rocker arm (A101): having one end provided for allowing the planetary wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the sun wheel (W101) of the planetary gear set (DG101) and the inner rotation part of electric machine (EM101) of the dual-drive electric machine (EM100) is served as an output/input end, the rocker arm (A101) linked by the planetary wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end;

The outer annular wheel (W102) of the planetary gear set (DG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

According to the embodiment shown in FIG. 2, the operations of the dual-drive electric machine having controllable planetary gear set (1) of the present invention include one or more than one of following functions:

When the controllable brake device (BK102) is controlled to be in the releasing state, and the dual-drive electric machine (EM100) is not operated as the electric machinery function, the transmission relations between the rotation shaft (S101) and the sleeve type rotation shaft (AS101) and the rotation shaft (S102) are in the releasing state allowing idle rotation;

When the controllable brake device (BK102) is controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK102) is controlled to be in the brake locking state, and the dual-drive electric machine (EM100) is not operated as the electric machinery function, the transmission relation between the rotation shaft (S101) and the sleeve type rotation shaft (AS101) is in a connecting relation allowing for transmission;

When the controllable brake device (BK102) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function for performing interactive operations according to the damping of the external load or the externally inputted rotary kinetic energy sustained by the rotation shaft (S101) and the sleeve type rotation shaft (AS101);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 3:
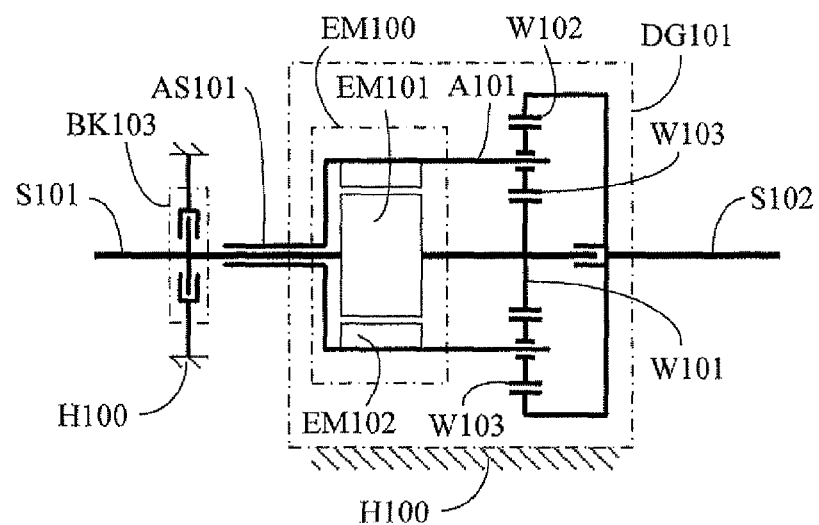
FIG. 3 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end and provided for connecting, with an action side of the controllable brake device (BK103) while the other action side of the controllable brake device (BK103) being fixed in the housing (H100), the planetary gear set (DG101) also being fixed in the housing (H100), the planetary wheel (W103) of the planetary gear set (DG101) being provided for linking the rocker arm (A101) and combined with the outer rotation part of electric machine (EM102) and the sleeve type rotation shaft (AS101), the sleeve type rotation shaft (AS101) being served as an output/input end, and the outer annular wheel (W102) of the planetary gear set (DG101) being provided for driving the rotation shaft (S102) to be served as an output/input end, according to one embodiment of the present invention.

FIG. 3 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end and provided for connecting with an action side of the controllable brake device (BK103) while the other action side of the controllable brake device (BK103) being fixed in the housing (H100), the planetary gear set (DG101) also being fixed in the housing (H100), the planetary wheel (W103) of the planetary gear set (DG101) being provided for linking the rocker arm (A101) and combined with the outer rotation part of electric machine (EM102) and the sleeve type rotation shaft (AS101), the sleeve type rotation shaft (AS101) being served as an output/input end, and the outer annular wheel (W102) of the planetary gear set (DG101) being provided for driving the rotation shaft (S102) to be served as an output/input end, according to one embodiment of the present invention.

As show in FIG. 3, it mainly consists of:

Planetary gear set (DG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

Rocker arm (A101): having one end provided for allowing the planetary wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the sun wheel (W101) of the planetary gear set (DG101) and the inner rotation part of electric machine (EM101) of the dual-drive electric machine (EM100) is served as an output/input end for connecting to an action side of the controllable brake device (BK103) while the other action side of the controllable brake device (BK103) is fixed in the housing (H100);

The planetary wheel (W103) of the planetary gear set (DG101) is provided for linking the rocker arm (A101) and combined with the outer rotation part of electric machine (EM102) and combined with the sleeve type rotation shaft (AS101), the sleeve type rotation shaft (AS101) rotated and sleeved on the rotation shaft (S101) is served as an output/input end, the outer annular wheel (W102) of the planetary gear set (DG101) is provided for driving the rotation shaft (S102) to be served as an output/input end, and the rotation shaft (S101) connected to the sun wheel (W101) is also served as an output/input end;

The operations of the dual-drive electric machine having controllable planetary gear set (1) shown in FIG. 3 include one or more than one of following functions:

When the controllable brake device (BK103) is controlled to be in the releasing state, and the dual-drive electric machine (EM100) is not operated as the electric machinery function, the transmission relation between the rotation shaft (S101) and the sleeve type rotation shaft (AS101) and the rotation shaft (S102) are in the releasing state allowing idle rotation;

When the controllable brake device (BK103) is controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK103) is controlled to be in the brake locking state, and the dual-drive electric machine (EM100) is not operated as the electric machinery function, the transmission relation between the sleeve type rotation shaft (AS101) and the rotation shaft (S102) is in a connecting relation allowing for transmission;

When the controllable brake device (BK103) is controlled to be in the brake locking state, and the dual-drive electric machine (EM100) is operated as the electric machinery function, between the inner rotation part of electric machine (EM101) and the outer rotation part of electric machine (EM102) is operated as the power generator function or the motor function for performing interactive operations according to the damping of the external load or the externally inputted rotary kinetic energy sustained by the sleeve type rotation shaft (AS101) and the rotation shaft (S102);

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 4:
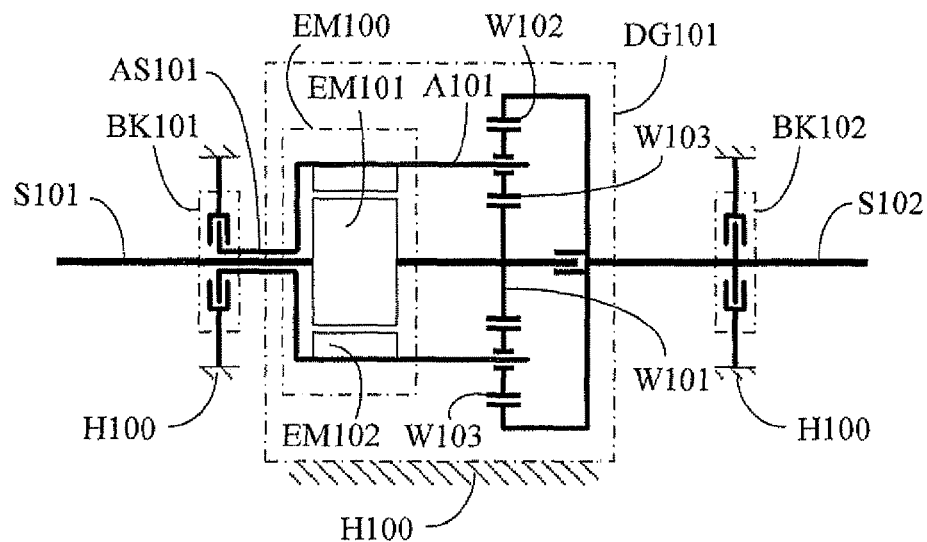
FIG. 4 is a schematic structural view showing the controllable brake device (BK102) being further installed between the rotation shaft (S102) and the housing (H100) as shown in FIG. 1.

FIG. 4 is a schematic structural view showing the controllable brake device (BK102) being further installed between the rotation shaft (S102) and the housing (H100) as shown in FIG. 1.

As shown in FIG. 4, the rotation shaft (S101) shared by the sun wheel (W101) of the planetary gear set (DG101) and the inner rotation part of electric machine (EM101) of the dual-drive electric machine (EM100) is served as an output/input end, the rocker arm (A101) linked by the planetary wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), the planetary gear set (DG101) is also fixed in the housing (H100), the outer annular wheel (W102) of the planetary gear set (DG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

Planetary gear set (DG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

Rocker arm (A101): having one end provided for allowing the planetary wheel (W103) to rotate and link, and the other end axially extending toward the rotation shaft (S101) for being combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the sun wheel (W101) of the planetary gear set (DG101) and the inner rotation part of electric machine (EM101) of the dual-drive electric machine (EM100) is served as an output/input end, the outer annular wheel (W102) of the planetary gear set (DG101) combined with the rotation shaft (S102) is served as an output/input end, the rocker arm (A101) linked by the planetary wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end, and the sleeve type rotation shaft (AS101) is connected to an action side of the controllable brake device (BK101) while the other action side of the controllable brake device (BK101) is fixed in the housing (H100), the outer annular wheel (W102) of the planetary gear set (DG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

According to the embodiment shown in FIG. 4, the operations of the dual-drive electric machine having controllable planetary gear set (1) of the present invention include one or more than one of following functions:

When the controllable brake device (BK101) and the controllable brake device (BK102) are both controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK102) are both controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state and the controllable brake device (BK102) is controlled to be in the releasing state, and the dual-drive electric machine (EM100) is not operated as the electric machinery function, the transmission relation between the rotation shaft (S101) and the rotation shaft (S102) is in a connecting relation allowing for transmission;

When the controllable brake device (BK101) is controlled to be in the brake locking state and the controllable brake device (BK102) is controlled to be in the releasing state, and the dual-drive electric machine (EM100) is operated as the electric machinery function, between the inner rotation part of electric machine (EM101) and the outer rotation part of electric machine (EM102) is operated as the power generator function or the motor function for performing corresponding interactive operations with the damping of the external load or the externally inputted rotary kinetic energy sustained by the rotation shaft (S101) and the rotation shaft (S102);

When the controllable brake device (BK101) is controlled to be in the releasing state and the controllable brake device (BK102) is controlled to be in the brake locking state, and the dual-drive electric machine (EM100) is not operated as the electric machinery function, the transmission relation between the rotation shaft (S101) and the sleeve type rotation shaft (AS101) is in a connecting relation allowing for transmission;

When the controllable brake device (BK101) is controlled to be in the releasing state and the controllable brake device (BK102) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK101) and the controllable brake device (BK102) are both controlled to be in the brake locking state, the relations between the rotation shaft (S101), the rotation shaft (S102) and the sleeve type rotation shaft (AS101) are all in the brake locking state;

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 5:
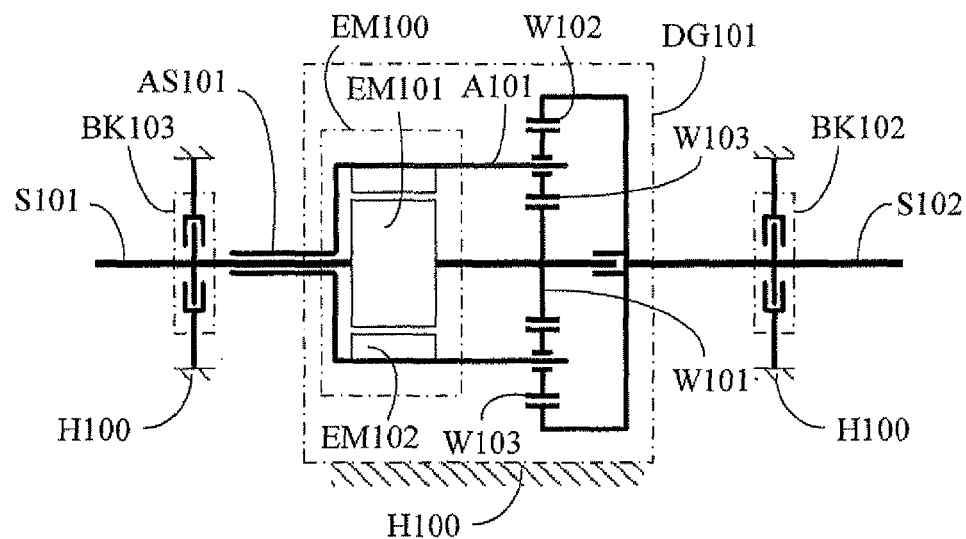
FIG. 5 is a schematic structural view showing the controllable brake device (BK103) being further installed between the rotation shaft (S101) and the housing (H100) as shown in FIG. 2.

FIG. 5 is a schematic structural view showing the controllable brake device (BK103) being further installed between the rotation shaft (S101) and the housing (H100) as shown in FIG. 2.

As shown in FIG. 5, the rotation shaft (S101) shared by the sun wheel (W101) of the planetary gear set (DG101) and the inner rotation part of electric machine (EM101) of the dual-drive electric machine (EM100) is served as an output/input end and provided for connecting to an action side of the controllable brake device (BK103) while the other action side of the controllable brake device (BK103) is fixed in the housing (H100), the planetary gear set (DG101) is also fixed in the housing (H100), the planetary wheel (W103) of the planetary gear set (DG101) is provided for linking the rocker arm (A101) and combined with the outer rotation part of electric machine (EM102) and combined with the sleeve type rotation shaft (AS101), and the sleeve type rotation shaft (AS101) rotated and sleeved on the rotation shaft (S101) is served as an output/input end, the outer annular wheel (W102) of the planetary gear set (DG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

Planetary gear set (DG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

Rocker arm (A101): having one end provided for allowing the planetary wheel (W103) to rotate and link, and the other end axially extending toward the rotation shaft (S101) for being combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected the rotation shaft (S102), and the other action side is fixed in the housing (H100);

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the sun wheel (W101) of the planetary gear set (DG101) and the inner rotation part of electric machine (EM101) of the dual-drive electric machine (EM100) is served as an output/input end, and is provided for connecting to an action side of the controllable brake device (BK103) while the other action side of the controllable brake device (BK103) is fixed in the housing (H100); the outer annular wheel (W102) of the planetary gear set (DG101) is combined with the rotation shaft (S102) for being served as an output/input end, and is provided for connecting to an action side of the controllable brake device (BK102) while the other action side of the controllable brake device (BK102) is fixed in the housing (H100), the rocker arm (A101) linked by the planetary wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end;

The operations of the dual-drive electric machine having controllable planetary gear set (1) of the present invention as shown in FIG. 5 include one or more than one of following functions:

When the controllable brake device (BK102) and the controllable brake device (BK103) are both controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK102) and the controllable brake device (BK103) are both controlled to be in the releasing state, and the dual-drive electric machine (EM100) is operated as the electric machinery function, the corresponding interactive operation of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK103) is controlled to be in the brake locking state and the controllable brake device (BK102) is controlled to be in the releasing state, and the dual-drive electric machine (EM100) is not operated as the electric machinery function, the transmission relation between the sleeve type rotation shaft (AS101) and the rotation shaft (S102) is in a connecting relation allowing for transmission;

When the controllable brake device (BK103) is controlled to be in the brake locking state and the controllable brake device (BK102) is controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the sleeve type rotation shaft (AS101) and the rotation shaft (S102);

When the controllable brake device (BK103) is controlled to be in the releasing state and the controllable brake device (BK102) is controlled to be in the brake locking state, and the dual-drive electric machine (EM100) is not operated as the electric machinery function, the transmission relation between the rotation shaft (S101) and the sleeve type rotation shaft (AS101) is in a connecting relation allowing for transmission;

When the controllable brake device (BK103) is controlled to be in the releasing state and the controllable brake device (BK102) is controlled to be in the brake locking state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK101) and the controllable brake device (BK102) are both controlled to be in the brake locking state, the relations between the rotation shaft (S101), the rotation shaft (S102) and the sleeve type rotation shaft (AS101) are all in the brake locking state;

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 6:
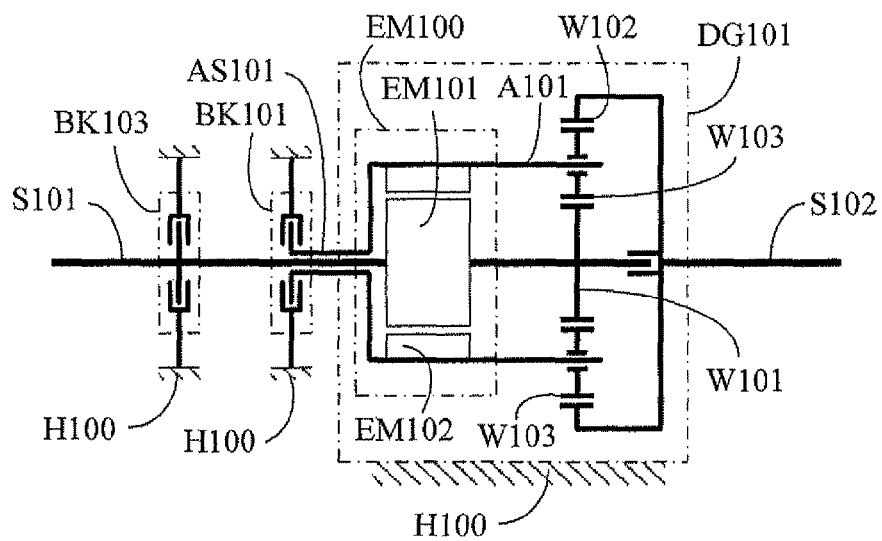
FIG. 6 is a schematic structural view showing the controllable brake device (BK101) being further installed between the sleeve type rotation shaft (AS101) and the housing (H100) as shown in FIG. 3.

FIG. 6 is a schematic structural view showing the controllable brake device (BK101) being further installed between the sleeve type rotation shaft (AS101) and the housing (H100) as shown in FIG. 3.

As shown in FIG. 6, the rotation shaft (S101) shared by the sun wheel (W101) of the planetary gear set (DG101) and the inner rotation part of electric machine (EM101) of the dual-drive electric machine (EM100) is served as an output/input end and provided for connecting to an action side of the controllable brake device (BK103) while the other action side of the controllable brake device (BK103) is fixed in the housing (H100), the planetary wheel (W103) of the planetary gear set (DG101) is provided for linking the rocker arm (A101) and combined with the outer rotation part of electric machine (EM102) and combined with the sleeve type rotation shaft (AS101), the sleeve type rotation shaft (AS101) is rotated and combined on the rotation shaft (S101) for being served as an output/input end, the sleeve type rotation shaft (AS101) is connected to an action side of the controllable brake device (BK101) while the other action side of the controllable brake device (BK101) is fixed in the housing (H100), the planetary gear set (DG101) is also fixed in the housing (H100), and the outer annular wheel (W102) of the planetary gear set (DG101) is provided for driving the rotation shaft (S102) to be served as an output/input end, which mainly consists of:

Planetary gear set (DG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);

Rocker arm (A101): having one end provided for allowing the planetary wheel (W103) to rotate and link, and the other end axially extending toward the rotation shaft (S101) for being combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);

Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);

Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the sun wheel (W101) of the planetary gear set (DG101) and the inner rotation part of electric machine (EM101) of the dual-drive electric machine (EM100) is served as an output/input end, and is provided for connecting to an action side of the controllable brake device (BK103) while the other action side of the controllable brake device (BK103) is fixed in the housing (H100);

The planetary wheel (W103) of the planetary gear set (DG101) is provided for linking the rocker arm (A101) and combined with the outer rotation part of electric machine (EM102) and combined with the sleeve type rotation shaft (AS101), and the sleeve type rotation shaft (AS101) rotated and sleeved on the rotation shaft (S101) is served as an output/input end, and the sleeve type rotation shaft (AS101) is connected to an action side of the controllable brake device (BK101) while the other action side of the controllable brake device (BK101) is fixed in the housing (H100), and the outer annular wheel (W102) of the planetary gear set (DG101) is provided for driving the rotation shaft (S102) to be served as an output/input end;

The operations of the dual-drive electric machine having controllable planetary gear set (1) as shown in FIG. 6 include one or more than one of following functions:

When the controllable brake device (BK101) and the controllable brake device (BK103) are both controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK103) are both controlled to be in the releasing state, and the dual-drive electric machine (EM100) is operated as the electric machinery function, the corresponding interactive operation of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state and the controllable brake device (BK103) is controlled to be in the releasing state, and the dual-drive electric machine (EM100) is not operated as the electric machinery function, the transmission relation between the rotation shaft (S101) and the rotation shaft (S102) is in a connecting relation allowing for transmission;

When the controllable brake device (BK101) is controlled to be in the brake locking state and the controllable brake device (BK103) is controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and rotation shaft (S102);

When the controllable brake device (BK101) is controlled to be in the releasing state and the controllable brake device (BK103) is controlled to be in the brake locking state, and the dual-drive electric machine (EM100) is not operated as the electric machinery function, the transmission relation between the rotation shaft (S102) and the sleeve type rotation shaft (AS101) is in a connecting relation allowing for transmission;

When the controllable brake device (BK101) is controlled to be in the releasing state and the controllable brake device (BK103) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S102) and the sleeve type rotation shaft (AS101);

When the controllable brake device (BK101) and the controllable brake device (BK102) are both controlled to be in the brake locking state, the relations between the rotation shaft (S101), the rotation shaft (S102) and the sleeve type rotation shaft (AS101) are all in the brake locking state.

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 7:
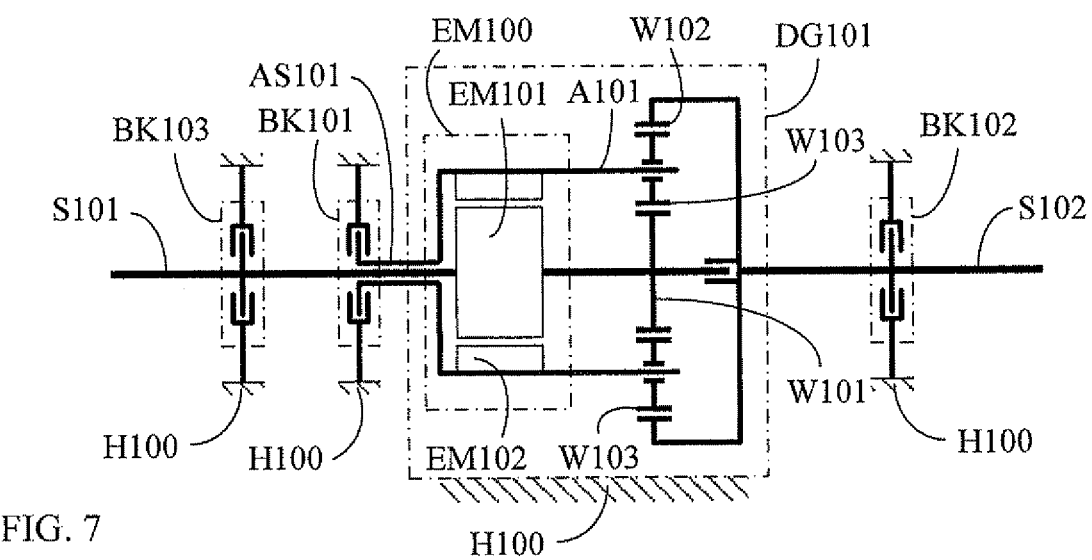
FIG. 7 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end and provided for connecting to an action side of the controllable brake device (BK103) while the other action side of the controllable brake device (BK103) being fixed in the housing (H100), the planetary wheel (W103) of the planetary gear set (DG101) is provided for linking the rocker arm (A101) and combined with the outer rotation part of electric machine (EM102) and combined with the sleeve type rotation shaft (AS101), the sleeve type rotation shaft (AS101) being rotated and sleeved on the rotation shaft (S101) for being served as an output/input end, the sleeve type rotation shaft (AS101) being connected to an action side of the controllable brake device (BK101) while the other action side of the controllable brake device (BK101) being fixed in the housing (H100), the planetary gear set (DG101) also being fixed in the housing (H100), and the outer annular wheel (W102) of the planetary gear set (DG101) being provided for driving the rotation shaft (S102) to be served as an output/input end, and the rotation shaft (S102) being connected to an action side of the controllable brake device (BK102) while and the other action side of the controllable brake device (BK102) being fixed in the housing (H100), according to one embodiment of the present invention.

FIG. 7 is a schematic structural view showing the rotation shaft (S101) shared by the sun wheel (W101) of the planetary gear set (DG101) and the inner rotation part of electric machine (EM101) of the dual-drive electric machine (EM100) being served as an output/input end and provided for connecting to an action side of the controllable brake device (BK103) while the other action side of the controllable brake device (BK103) being fixed in the housing (H100), the planetary wheel (W103) of the planetary gear set (DG101) is provided for linking the rocker arm (A101) and combined with the outer rotation part of electric machine (EM102) and combined with the sleeve type rotation shaft (AS101), the sleeve type rotation shaft (AS101) being rotated and sleeved on the rotation shaft (S101) for being served as an output/input end, the sleeve type rotation shaft (AS101) being connected to an action side of the controllable brake device (BK101) while the other action side of the controllable brake device (BK101) being fixed in the housing (H100), the planetary gear set (DG101) also being fixed in the housing (H100), and the outer annular wheel (W102) of the planetary gear set (DG101) being provided for driving the rotation shaft (S102) to be served as an output/input end, and the rotation shaft (S102) being connected to an action side of the controllable brake device (BK102) while and the other action side of the controllable brake device (BK102) being fixed in the housing (H100), according to one embodiment of the present invention.

As shown in FIG. 7, the rotation shaft (S101) shared by the sun wheel (W101) of the planetary gear set (DG101) and the inner rotation part of electric machine (EM101) of the dual-drive electric machine (EM100) is served as an output/input end and provided for connecting to an action side of the controllable brake device (BK103) while the other action side of the controllable brake device (BK103) is fixed in the housing (H100), the planetary wheel (W103) of the planetary gear set (DG101) is provided for linking the rocker arm (A101) and combined with the outer rotation part of electric machine (EM102) and combined with the sleeve type rotation shaft (AS101), the sleeve type rotation shaft (AS101) is rotated and sleeved on the rotation shaft (S101) for being served as an output/input end, the sleeve type rotation shaft (AS101) is connected to an action side of the controllable brake device (BK101) while the other action side of the controllable brake device (BK101) is fixed in the housing (H100), the planetary gear set (DG101) is also fixed in the housing (H100), the outer annular wheel (W102) of the planetary gear set (DG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

- Planetary gear set (DG101): which is constituted by an sun wheel (W101) and an outer annular wheel (W102) and at least an planetary wheel (W103), and including through gears engaging with each other, or through friction wheels mutually performing friction transmissions to form an planetary gear set function, and structured by the rotation shaft (S101), the rotation shaft (S102), the rocker arm (A101), the sleeve type rotation shaft (AS101) and a bearing, as well as installed with a shell for being combined in the housing (H100);
- Rocker arm (A101): having one end provided for allowing the planetary wheel (W103) to rotate and link, and the other end axially extending toward the rotation shaft (S101) for being combined with the sleeve type rotation shaft (AS101), and the sleeve type rotation shaft (AS101) is sleeved on one or both of the rotation shaft (S101) and the rotation shaft (S102) and capable of rotating thereon;
- Controllable brake device (BK101): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101), and the other action side is fixed in the housing (H100);
- Controllable brake device (BK102): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102), and the other action side is fixed in the housing (H100);
- Controllable brake device (BK103): which is constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101), and the other action side is fixed in the housing (H100);
- Dual-drive electric machine (EM100): which is constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);
- The rotation shaft (S101) shared by the sun wheel (W101) of the planetary gear set (DG101) and the inner rotation part of electric machine (EM101) of the dual-drive electric machine (EM100) is served as an output/input end, and is provided for connecting to an action side of the controllable brake device (BK103) while the other action side of the controllable brake device (BK103) is fixed in the housing (H100);
- The planetary wheel (W103) of the planetary gear set (DG101) is provided for linking the rocker arm (A101) and combined with the outer rotation part of electric machine (EM102) and combined with the sleeve type rotation shaft (AS101), the sleeve type rotation shaft (AS101) rotated and sleeved on the rotation shaft (S101) is served as an output/input end, the sleeve type rotation shaft (AS101) is connected to an action side of the controllable brake device (BK101) while the other action side of the controllable brake device (BK101) is fixed in the housing (H100), the outer annular wheel (W102) of the planetary gear set (DG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

The operations of the dual-drive electric machine having controllable planetary gear set (1) as shown in FIG. 7 include one or more than one of following functions:

- When the controllable brake device (BK101) and the controllable brake device (BK102) and the controllable brake device (BK103) are all controlled to be in the releasing state, and the dual-drive electric machine (EM100) is not operated as the electric machinery function, the transmission relations between the rotation shaft (S101) and the rotation shaft (S102) and the sleeve type rotation shaft (AS101) are in the releasing state allowing idle rotation;
- When the controllable brake device (BK101) and the controllable brake device (BK102) and the controllable brake device (BK103) are all controlled to be in the releasing state, and the dual-drive electric machine (EM100) is operated as the electric machinery function, the corresponding interactive operations of the power generator function or the motor function are correspondingly performed between the inner rotation part of electric machine (EM101) and the outer rotation part of electric machine (EM102), according to the damping of the external load or the rotation torque, the rotation speed and the rotation direction of the externally inputted rotary kinetic energy sustained by the rotation shaft (S101), the rotation shaft (S102) and the sleeve type rotation shaft (AS101);
- When the controllable brake device (BK101) is controlled to be in the brake locking state, the controllable brake device (BK102) and the controllable brake device (BK103) are controlled to be in the releasing state, and the dual-drive electric machine (EM100) is not operated as the electric machinery function, the transmission relation between the rotation shaft (S101) and the rotation shaft (S102) is in a connecting relation allowing for transmission;

When the controllable brake device (BK101) is controlled to be in the brake locking state, the controllable brake device (BK102) and the controllable brake device (BK103) are controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and rotation shaft (S102);

When the controllable brake device (BK102) is controlled to be in the brake locking state, the controllable brake device (BK101) and the controllable brake device (BK103) are controlled to be in the releasing state, and the dual-drive electric machine (EM100) is not operated as the electric machinery function, the transmission relation between the rotation shaft (S101) and the sleeve type rotation shaft (AS101) is in a connecting relation allowing for transmission;

When the controllable brake device (BK102) is controlled to be in the brake locking state, the controllable brake device (BK101) and the controllable brake device (BK103) are controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK103) is controlled to be in the brake locking state, the controllable brake device (BK101) and the controllable brake device (BK102) are controlled to be in the releasing state, and the dual-drive electric machine (EM100) is not operated as the electric machinery function, the transmission relation between the rotation shaft (S102) and the sleeve type rotation shaft (AS101) is in a connecting relation allowing for transmission;

When the controllable brake device (BK103) is controlled to be in the brake locking state, the controllable brake device (BK101) and the controllable brake device (BK102) are controlled to be in the releasing state, and the dual-drive electric machine (EM100) is operated as the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S102) and the sleeve type rotation shaft (AS101);

When two or all of the controllable brake device (BK101) and the controllable brake device (BK102) and the controllable brake device (BK103) are controlled to be in the brake locking state, the relations between the rotation shaft (S101), the rotation shaft (S102) and the sleeve type rotation shaft (AS101) are all in the brake locking state;

The interactive operations of corresponding function performed by the mentioned dual-drive electric machine (EM100) include receiving the driving control of externally inputted electric energy to operate as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

The dual-drive electric machine having controllable planetary gear set (1) of the present invention can be applied to various load devices which require mechanical output for driving, such as a ground vehicle, rail vehicle, agriculture machineries or agriculture vehicles, excavator, dozer, construction vehicle, transportation vehicle, garbage truck, hoisting machinery, lifting machinery, forklift machinery, water or underwater boat, aircraft, industrial machineries, tool machine, power device, hand-operated tool, robot or mechanical arm, gardening power tool, domestic electric equipment;

According to the dual-drive electric machine having controllable planetary gear set (1) of the present invention, the sources of externally inputted rotary kinetic energy include an inner combustion engine, an outer combustion engine, a Sterling engine, a steam engine, electric engine, hydraulic engine, pneumatic engine, wind-driven blade device, flow-driven blade device, vapor-driven blade device, human or animal forces.

The invention claimed is:

1. A dual-drive electric machine and planetary gear set assembly, comprising:
   a single electric machine (EM100) having an inner rotation part (EM101) and an outer rotation part (EM102), the inner rotation part (EM101) and outer rotation part (EM102) being rotatable relative to each other, and the inner rotation part (EM101) being situated inside the outer rotation part (EM102);
   a planetary gear set (DG101) having a sun wheel (W101), an outer planetary wheel (W102), a rocker arm (A101) on which is rotatably mounted at least one planetary wheel (W103) directly rotatably engaged with the sun wheel (W101) and directly rotatably engaged with the outer planetary wheel (W102), and a sleeve type rotation shaft (AS101) combined with the rocker arm (A101);
   a first rotation shaft (S101);
   a second rotation shaft (S102);
   at least one controllable brake device (BK101, BK102, and/or BK103); and
   a housing (H100) of the planetary gear set (DG101), wherein:
   the inner rotation part (EM101) is combined with the sun wheel (W101) and the first rotation shaft (S101),
   the outer rotation part (EM102) is combined with the rocker arm (A101),
   the outer planetary wheel (W102) is combined with the second rotation shaft (S102),
   the first rotation shaft (S101) serves as a first output/input end of the dual-drive electric machine and planetary gear set assembly, the second rotation shaft (S102) serves as a second output/input end of the dual-drive electric machine and planetary gear set assembly, the sleeve type rotation shaft (AS101) serves as a third output/input end of the dual-drive electric machine and planetary gear set assembly, a first action side of the at least one controllable brake device (BK101, BK102, and/or BK103) is controllable to lock and release at least one of the first, second, and third output/input ends of the dual-drive electric machine and planetary gear set assembly to control transmission of rotational energy between the first rotation shaft (S101), the second rotation shaft (S102) and the sleeve type rotation shaft (AS101), and thereby control interactive operations between the dual-drive electric machine (EM100) and the first, second, and third output/input ends, and a second action side of the at least one controllable brake device (BK101, BK102, and/or BK103) is connected to the housing (H100).

2. A dual-drive electric machine and planetary gear set assembly as claimed in claim 1, wherein the at least one controllable brake device (BK101, BK102, and/or BK103) is a controllable brake device controlled by at least one of a manual, mechanical, hydraulic, pneumatic, or electromagnetic force.

3. A dual-drive electric machine and planetary gear set assembly as claimed in claim 1, wherein the dual-drive electric machine (EM100) is a DC or AC, brush or brushless, synchronous or asynchronous dual-drive electric machine and the inner rotation part (EM101) is coaxial with the outer rotation part (EM102).

4. A dual-drive electric machine and planetary gear set assembly as claimed in claim 3, wherein the dual-drive electric machine (EM100) is arranged to receive externally input electric energy to operate as a motor for carrying out at least one of the following operations: (a) individually driving a load, (b) driving the load in common with an external rotary kinetic energy source.

5. A dual-drive electric machine and planetary gear set assembly as claimed in claim 3, wherein the dual-drive electric machine is arranged to receive the external rotary kinetic energy or inertial kinetic energy of the load for operating the electric machine as a power generator for driving an external electric load or for charging an external electric storing device.

6. A dual-drive electric machine and planetary gear set assembly as claimed in claim 1, wherein the sleeve type rotation shaft is rotatably sleeved on the first rotation shaft (S101), the first action side of a first said at least one controllable brake device (BK101) is engageable with the sleeve type rotation shaft (AS101), which serves as the third output/input end of the dual-drive electric machine and planetary gear set assembly, and the second action side of the first controllable brake device (BK101) is fixed to the housing (H100).

7. A dual-drive electric machine and planetary gear set assembly as claimed in claim 6, wherein the dual-drive electric machine and planetary gear set assembly is arranged to carry out the following operations:

when the first controllable brake device (BK101) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101) is controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in a brake locking state and the dual-drive electric machine (EM100) is not operated as an electric machine, the first rotation shaft (S101) and the second rotation shaft (S102) are connected for transmission; and when the first controllable brake device (BK101) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102).

8. A dual-drive electric machine and planetary gear set assembly as claimed in claim 1, wherein the sleeve type rotation shaft is rotatably sleeved on the first rotation shaft (S101), the first action side of said at least one controllable brake device (BK102) is engageable with the second rotation shaft (S102), which serves as the second output/input end of the dual-drive electric machine and planetary gear set assembly, and the second action side of the at least one controllable brake device (BK102) is fixed to the housing (H100).

9. A dual-drive electric machine and planetary gear set assembly as claimed in claim 8, wherein the dual-drive electric machine and planetary gear set assembly is arranged to carry out the following operations:

when the at least one controllable brake device (BK102) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the at least one controllable brake device (BK102) is controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the at least one controllable brake device (BK102) is controlled to be in a brake locking state and the dual-drive electric machine (EM100) is not operated as an electric machine, the first rotation shaft (S101) and the sleeve type rotation shaft (AS101) are connected for transmission; and when the at least one controllable brake device (BK102) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101).

10. A dual-drive electric machine and planetary gear set assembly as claimed in claim 1, wherein the sleeve type rotation shaft is rotatably sleeved on the first rotation shaft (S101), the first action side of said at least one controllable brake device (BK103) is engageable with the first rotation shaft (S101), which serves as the first output/input end of the dual-drive electric machine and planetary gear set assembly, and the second action side of the at least one controllable brake device (BK103) is fixed to the housing (H100).

11. A dual-drive electric machine and planetary gear set assembly as claimed in claim 10, wherein the dual-drive electric machine and planetary gear set assembly is arranged to carry out the following operations:

when the at least one controllable brake device (BK103) is controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the at least one controllable brake device (BK103) is controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the at least one controllable brake device (BK103) is controlled to be in a brake locking state and the dual-drive electric machine (EM100) is not operated as an electric machine, the sleeve type rotation shaft (AS101) and the second rotation shaft (S102) are connected for transmission; and when the at least one controllable brake device (BK103) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the sleeve type rotation shaft (AS101) and the second rotation shaft (S102).

12. A dual-drive electric machine and planetary gear set assembly as claimed in claim 1, wherein the sleeve type rotation shaft is rotatably sleeved on the first rotation shaft (S101), the first action side of a first said at least one controllable brake device (BK101) is engageable with the sleeve type rotation shaft (AS101), which serves as the third output/input end of the dual-drive electric machine and planetary gear set assembly, the first action side of a second said at least one controllable brake device (BK102) is engageable with the second rotation shaft (S102), which serves as the second output/input end of the dual-drive electric machine and planetary gear set assembly, and the second action side of each of the first controllable brake device (BK101) and the second controllable brake device (BK102) is fixed to the housing (H100).

13. A dual-drive electric machine and planetary gear set assembly as claimed in claim 12, wherein the dual-drive electric machine and planetary gear set assembly is arranged to carry out the following operations:

when the first controllable brake device (BK101) and the second controllable brake device (BK102) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101) and the second controllable brake device (BK102) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in the brake locking state, the second controllable brake device (BK102) is controlled to be in the releasing state, and the dual-drive electric machine (EM100) is not operated as an electric machine, the first rotation shaft (S101) and the second rotation shaft (S102) are connected for transmission;

when the first controllable brake device (BK101) is controlled to be in the brake locking state, the second controllable brake device (BK102) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the first controllable brake device (BK101) is controlled to be in the releasing state, the second controllable brake device (BK102) is controlled to be in the brake locking state, and the dual-drive electric machine (EM100) is not operated as an electric machine, the first rotation shaft (S101) and the sleeve type rotation shaft (AS101) are connected for transmission;

when the first controllable brake device (BK101) is controlled to be in the releasing state, the second controllable brake device (BK102) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101); and when the first controllable brake device (BK101) and the second controllable brake device (BK102) are both in the brake locking state, the first rotation shaft (S101), the second rotation shaft (S102) and the sleeve type rotation shaft (AS101) are all locked.

14. A dual-drive electric machine and planetary gear set assembly as claimed in claim 1, wherein the sleeve type rotation shaft is rotatably sleeved on the first rotation shaft (S101), the at least one controllable brake device includes a first controllable brake device (BK102) and a second controllable brake device (BK103), the first action side of the first controllable brake device (BK102) is engageable with the second rotation shaft (S102), which serves as the second output/input end of the dual-drive electric machine and planetary gear set assembly, the first action side of the second controllable brake device (BK103) is engageable with the first rotation shaft (S101), which serves as the first output/input end of the dual-drive electric machine and planetary gear set assembly, and the second action side of each of the first controllable brake device (BK102) and the second controllable brake device (BK103) is fixed to the housing (H100).

15. A dual-drive electric machine and planetary gear set assembly as claimed in claim 14, wherein the dual-drive electric machine and planetary gear set assembly is arranged to carry out the following operations:
    when the first controllable brake device (BK102) and the second controllable brake device (BK103) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;
    when the first controllable brake device (BK102) and the second controllable brake device (BK103) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);
    when the first controllable brake device (BK102) is controlled to be in the brake locking state, the second controllable brake device (BK103) is controlled to be in the releasing state, and the dual-drive electric machine (EM100) is not operated as an electric machine, the sleeve type rotation shaft (AS101) and the first rotation shaft (S101) are connected for transmission;
    when the first controllable brake device (BK102) is controlled to be in the brake locking state, the second controllable brake device (BK103) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the sleeve type rotation shaft (AS101) and the first rotation shaft (S101);
    when the first controllable brake device (BK102) is controlled to be in the releasing state, the second controllable brake device (BK103) is controlled to be in the brake locking state, and the dual-drive electric machine (EM100) is not operated as an electric machine, the second rotation shaft (S102) and the sleeve type rotation shaft (AS101) are connected for transmission;
    when the first controllable brake device (BK102) is controlled to be in the releasing state, the second controllable brake device (BK103) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and
    when the first controllable brake device (BK102) and the second controllable brake device (BK103) are both in the brake locking state, the first rotation shaft (S101), the second rotation shaft (S102) and the sleeve type rotation shaft (AS101) are all locked.

16. A dual-drive electric machine and planetary gear set assembly as claimed in claim 1, wherein the sleeve type rotation shaft is rotatably sleeved on the first rotation shaft (S101), the at least one controllable brake device includes a first controllable brake device (BK101) and a second controllable brake device (BK103), the first action side of the first controllable brake device (BK101) is engageable with the sleeve type rotation shaft (AS101), which serves as the third output/input end of the dual-drive electric machine and planetary gear set assembly, the first action side of the second controllable brake device (BK103) is engageable with the first rotation shaft (S101), which serves as the first output/input end of the dual-drive electric machine and planetary gear set assembly, and the second action side of each of the first controllable brake device (BK101) and the second controllable brake device (BK103) is fixed to the housing (H100).

17. A dual-drive electric machine and planetary gear set assembly as claimed in claim 16, wherein the dual-drive electric machine and planetary gear set assembly is arranged to carry out the following operations:
    when the first controllable brake device (BK101) and the second controllable brake device (BK103) are both controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;
    when the first controllable brake device (BK101) and the second controllable brake device (BK103) are both controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);
    when the first controllable brake device (BK101) is controlled to be in the brake locking state, the second controllable brake device (BK103) is controlled to be in the releasing state, and the dual-drive electric machine (EM100) is not operated as an electric machine, the first rotation shaft (S101) and the second rotation shaft (S102) are connected for transmission;
    when the first controllable brake device (BK101) is controlled to be in the brake locking state, the second controllable brake device (BK103) is controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);
    when the first controllable brake device (BK101) is controlled to be in the releasing state, the second controllable brake device (BK103) is controlled to be in the brake locking state, and the dual-drive electric machine (EM100) is not operated as an electric machine, the second rotation shaft (S102) and the sleeve type rotation shaft (AS101) are connected for transmission;

when the first controllable brake device (BK101) is controlled to be in the releasing state, the second controllable brake device (BK103) is controlled to be in the brake locking state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and when the first controllable brake device (BK101) and the second controllable brake device (BK103) are both in the brake locking state, the first rotation shaft (S101), the second rotation shaft (S102) and the sleeve type rotation shaft (AS101) are all locked.

18. A dual-drive electric machine and planetary gear set assembly as claimed in claim 1, wherein the sleeve type rotation shaft is rotatably sleeved on the first rotation shaft (S101), the first action side of a first said at least one controllable brake device (BK101) is engageable with the sleeve type rotation shaft (AS101), which serves as the third output/input end of the dual-drive electric machine and planetary gear set assembly, the first action side of a second said at least one controllable brake device (BK102) is engageable with the second rotation shaft (S102), which serves as the second output/input end of the dual-drive electric machine and planetary gear set assembly, the first action side of a third said controllable brake device (BK103) is engageable with the first rotation shaft (S101), which serves as a first output/input end of the dual-drive electric machine and planetary gear set assembly, and the second action side of each of the first controllable brake device (BK101) and the second controllable brake device (BK102) is fixed to the housing (H100).

19. A dual-drive electric machine and planetary gear set assembly as claimed in claim 18, wherein the dual-drive electric machine and planetary gear set assembly is arranged to carry out the following operations:

when the first controllable brake device (BK101), the second controllable brake device (BK102), and the third controllable brake device (BK103) are all controlled to be in a releasing state and the dual-drive electric machine (EM100) is not operated as an electric machine, the first rotation shaft (S101), the second rotation shaft (S102), and the sleeve type rotation shaft (AS101) are in a released state of idle rotation;

when the first controllable brake device (BK101), and the second controllable brake device (BK102), and the third controllable brake device (BK103) are all controlled to be in the releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in the brake locking state, the second controllable brake device (BK102) and the third controllable brake device (BK103) are both controlled to be in the releasing state, and the dual-drive electric machine (EM100) is not operated as an electric machine, the first rotation shaft (S101) and the second rotation shaft (S102) are connected for transmission;

when the first controllable brake device (BK101) is controlled to be in the brake locking state, the second controllable brake device (BK102) and the third controllable brake device (BK103) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the second controllable brake device (BK102) is controlled to be in the brake locking state, the first controllable brake device (BK101) and the third controllable brake device (BK103) are both controlled to be in the releasing state, and the dual-drive electric machine (EM100) is not operated as an electric machine, the first rotation shaft (S101) and the sleeve type rotation shaft (AS101) are connected for transmission;

when the second controllable brake device (BK102) is controlled to be in the brake locking state, the first controllable brake device (BK101) and the third controllable brake device (BK103) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101);

when the third controllable brake device (BK103) is controlled to be in the brake locking state, the first controllable brake device (BK101) and the second controllable brake device (BK102) are both controlled to be in the releasing state, and the dual-drive electric machine (EM100) is not operated as an electric machine, the second rotation shaft (S102) and the sleeve type rotation shaft (AS101) are connected for transmission;

when the third controllable brake device (BK103) is controlled to be in the brake locking state, the first controllable brake device (BK101) and the second controllable brake device (BK102) are both controlled to be in the releasing state, and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and when at least two of the first controllable brake device (BK101), the second controllable brake device (BK102), and the third controllable brake device (BK103) are in the brake locking state, the first rotation shaft (S101), the second rotation shaft (S102) and the sleeve type rotation shaft (S103) are all locked.

* * * * *